United States Patent [19]

Chant

[11] 3,989,781
[45] Nov. 2, 1976

[54] PROCESS FOR PRODUCING A FIBROUS REINFORCED THERMOSETTING RESIN IMPREGNATED FOAMED POLYMERIC RESIN ARTICLE

[75] Inventor: Peter R. Chant, Delft, Netherlands

[73] Assignee: Shell Oil Company, Houston, Tex.

[22] Filed: June 20, 1974

[21] Appl. No.: 481,073

Related U.S. Application Data

[63] Continuation of Ser. No. 279,396, Aug. 10, 1972, abandoned.

[30] Foreign Application Priority Data

Aug. 17, 1971  United Kingdom............... 38524/71

[52] U.S. Cl.............................. 264/46.4; 264/46.5; 264/257; 264/258; 428/311; 428/313; 428/314; 428/315

[51] Int. Cl.²................. B29D 27/04; B32B 27/04; B32B 27/12; B32B 5/28

[58] Field of Search ............... 264/45, 46, 54, 46.6, 264/46.4, 257, 46.5, 258

[56] References Cited
UNITED STATES PATENTS

| | | | |
|---|---|---|---|
| 2,927,876 | 3/1960 | Hoppe et al. | 264/46 |
| 3,193,598 | 7/1965 | Schafer | 264/54 X |
| 3,286,004 | 11/1966 | Hill et al. | 264/45 |
| 3,546,060 | 12/1970 | Hoppe et al. | 264/45 X |
| 3,661,674 | 5/1972 | Higgs et al. | 428/311 X |
| 3,867,221 | 2/1975 | Chant | 428/311 X |
| 3,915,772 | 10/1975 | Weissenfels et al. | 428/314 X |
| 3,915,783 | 10/1975 | Goppel et al. | 428/311 X |
| 3,944,704 | 3/1976 | Dirks | 428/311 X |

FOREIGN PATENTS OR APPLICATIONS

1,266,097   3/1972   United Kingdom................ 264/257

*Primary Examiner*—Philip Anderson
*Attorney, Agent, or Firm*—Norris E. Faringer

[57] ABSTRACT

This invention relates to an improvement in the process of preparing an article of a reinforced thermosetting resin. The known process comprises a) impregnating a foam sheet with a curable thermosetting resin, b) applying a layer of fibrous reinforcing material to a side of the impregnated foam sheet, c) compressing the impregnated foam sheet so that the resin impregnates the fibrous material, and d) allowing the sheet and layer to cure while compressed. The improvement of this invention comprises effecting the compression of the foamed sheet and fibrous material by the expansion pressure of a foaming composition.

3 Claims, 1 Drawing Figure

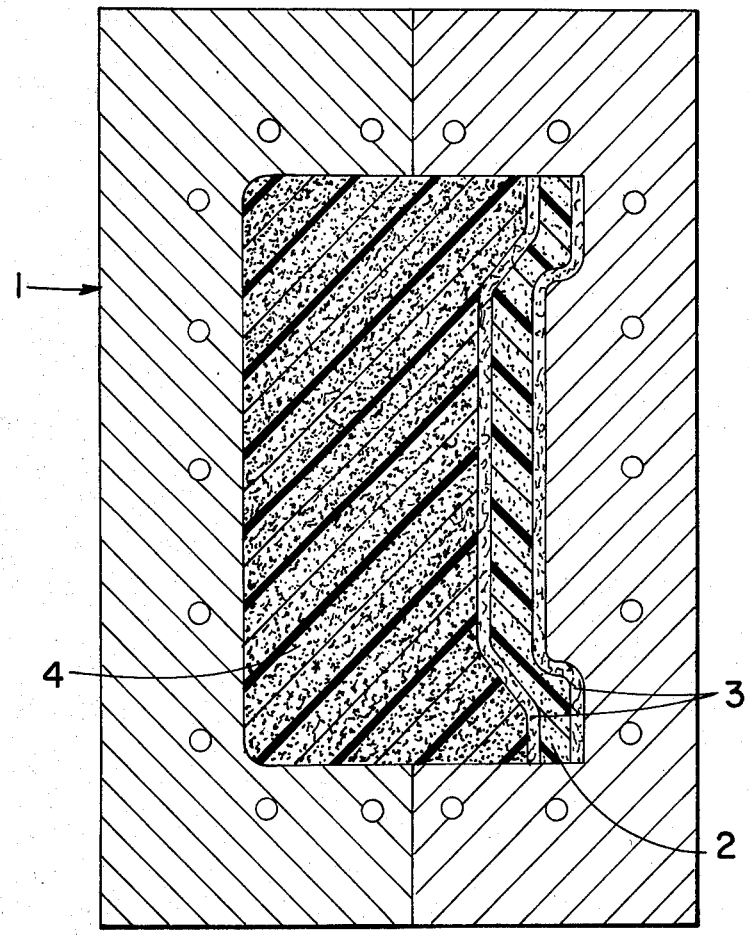

PROCESS FOR PRODUCING A FIBROUS REINFORCED THERMOSETTING RESIN IMPREGNATED FOAMED POLYMERIC RESIN ARTICLE

This is a continuation of application Ser. No. 279,396, filed Aug. 10, 1972, now abandoned.

BACKGROUND OF THE INVENTION

1. Field of the Invention

The invention relates to a method of producing an article of thermosetting resin.

2. Prior Art

In British Pat. No. 1,266,097 a method of producing an article of thermosetting resin is proposed, which comprises impregnating a sheet having an open-cell foam structure with a curable thermosetting resin, applying a layer of fibrous reinforcing material to a side of the impregnated foam sheet, compressing the foam sheet and reinforcing layer so that resin is expelled from the sheet into the fibrous reinforcing layer thus impregnating this layer with resin throughout its thickness, and allowing the resin in the sheet and layer to cure whilst maintaining the compression.

In accordance with the present invention, the compression of the assembly formed by the impregnated foam sheet and reinforcing layer is effected by the expansion pressure of a foaming composition. The present method has the advantage that no special compression means are required to compress the resin impregnated foam sheet, because the expansion pressure of a foaming composition is used for this purpose. Furthermore, the resulting product, which consists of a layer of foamed material formed by the foaming composition with a rigid facing formed by the compressed original foam sheet and resin-impregnated fibrous material, is particularly useful for many applications. Depending on the intended use of this product, the foaming composition can be selected so as to produce a foam which is rigid, flexible or semi-flexible.

SUMMARY OF THE INVENTION

In the process of making an article of thermosetting resin, which comprises a. impregnating a sheet having an open-cell foam structure with a curable thermosetting resin, b. applying a layer of fibrous reinforcing material to a side of the impregnated foam sheet, c. compressing the foam sheet and reinforcing layer so that resin is expelled from the foam sheet into the reinforcing layer thus impregnating this layer with resin throughout its thickness, and d. allowing the resin in the foam sheet and reinforcing layer to cure while maintaining the compression; the improvement which comprises effecting the compression of the foam sheet and reinforcing layer by the expansion pressure of a foaming composition.

The drawing is a sectional view illustrating the mold in a closed position and the final product.

PREFERRED EMBODIMENT

The foaming composition is preferably a composition capable of forming a polyurethane foam, and the invention is herein described using a composition of this kind. However, it is to be understood that any foaming composition capable of generating the required expansion pressure may be used, examples being compositions forming a foamed rubber or foamed urea formaldehyde.

The foaming polyurethane composition can be in direct contact with the impregnated foam sheet, 2, whereby a small amount of the composition will penetrate into the foam sheet and thereby improve anchorage of the polyurethane foam, 4 to the other layers. If penetration of the polyurethane foam, 4 into the foam sheet, 2 is not desired, or, for any other reason, one or more intermediate layers of material may be placed between the foaming polyurethane composition and the assembly formed by the impregnated foam sheet, 2 and reinforcing layer, 3. These intermediate layers can be sheets or films of paper or of thermoplastic material, or webs or tissue of fibrous material such as made of textile or glass fiber.

In order that the expanding polyurethane foam, 4 may develop full pressure on the foam sheet, 2, the expansion preferably should take place in an enclosed space, normally a closed mold, 1. The assembly formed by the foam sheet, 2 and reinforcing layer, 3 is placed in the mold, 1, usually with the reinforcing layer against the molding surface of the mold. A mold release agent may have been applied to the molding surface to facilitate the removal of the final product from the mold. The mold, 1 can have any desired shape; for example, the mold has two molding surfaces extending parallel to each other either straight or in a curved direction so that the product being molded will be a straight or curved article. Once the assembly is placed in the mold, the polyurethane foam forming composition is poured or sprayed (or injected, if the mold is already closed) as an unfoamed liquid or as a partly foamed liquid (froth) in the desired quantity in the open space remaining in the mold. The mold, 1, if still open, is then closed, and the liquid composition is permitted to foam to the fullest possible extent, whereby an expansion pressure may be generated in the order of 0.5 kg/cm$^2$ or more, which is adequate to compress the impregnated foam sheet, 2 and to drive out the resin therefrom into the reinforcing layer, 3 so as to impregnate this layer throughout its thickness.

After the polyurethane foam and the thermosetting resin in the remaining part of the product have cured to the desired extent, the mold is opened and the product removed therefrom. The product comprises at least the following layers: a rigid layer of fiber-reinforced hardened thermosetting resin, a rigid layer of compressed foam sheet filled completely or substantially with hardened resin, and a layer of polyurethane foam. Normally, the thickness of the layers filled with the thermosetting resin is small as compared with the thickness of the polyurethane foam layer, so that these first layers actually form a hard and rigid skin on the polyurethane foam.

Various other arrangements are possible. For example, a sandwichlike construction can be produced in which the polyurethane foam layer is covered at both sides with a rigid skin. For this purpose, the assembly formed by the impregnated foam sheet and reinforcing layer is placed near one side of the mold, and another such assembly is placed at some distance from the first one near another side of the mold. Preferably, the reinforcing layer in each assembly is facing the side of the mold where the assembly is placed. The mold cavity left between the two assemblies is then filled to the desired volume with the polyurethane foam forming composition.

The products resulting from this invention are suitable for a wide range of uses, such as for making body elements, for motor cars and aircraft (seats, doors, panels, crash pads), boat hulls, furniture and skis.

EXAMPLE

An impregnated foam sheet was made by passing a 5 mm thick sheet of flexible polyurethane foam through a bath containing a liquid epoxy resin system. In the bath, the sheet was compressed followed by expansion to soak it with resin. Excess resin was expelled from the sheet by passage through a pair of squeeze rollers. A layer of fibrous reinforcing material formed by a mat of glass fibers was placed on either side of the impregnated foam sheet, and the assembly was then placed in a mold. The mold was formed with two parallel molding surfaces 63 mm apart and about 90 cm long. The molding surfaces had been coated with a mold release agent, and the assembly was placed against one of these surfaces. In the mold, two glass fiber surface tissues were laid on the exposed surface of the assembly, which thereby acquired a total thickness of about 8 mm. In the open space between these glass fiber tissues and the other molding surface, some 55 mm wide, a homogeneously mixed composition capable of forming a rigid polyurethane foam was poured, and the mold was then closed. The polyurethane forming composition consisted of 100 parts polyol, 135 parts di-isocyanate, and 20 parts trichloromonofluoromethane (all parts by weight). The mold was left closed for 20 minutes without the supply of external heat. Accordingly, the epoxy resin system was allowed to cure at room temperature, although, if desired, the curing process can be accelerated by heating of the mold to about 50°

C. After the product was taken from the mold, it was found that the original impregnated foam sheet with glass fiber layers had formed a rigid skin of 2–3 mm thickness on the polyurethane foam.

We claim as our invention:

1. A process for producing a fibrous reinforced thermosetting resin imprenated foamed polymeric resin article comprising the steps of:
    1. impregnating a flexible open-cell foamed resin sheet with a liquid, heat-curable thermosetting resin,
    2. applying a layer of at least one fibrous reinforcing material to both sides of said resin-impregnated foamed resin sheet, to form an assembly
    3. lining at least a portion of the mold cavity of a closeable mold with said assembly of resin impregnated foamed resin sheet and reinforcing layers,
    4. injecting a polyurethane foam-forming composition into said closeable mold and closing said mold,
    5. permitting said foam-forming composition to expand in the closed mold thereby compressing said impregnated foam sheet and reinforcing layers so that the thermosetting resin is expelled from the foam sheet into the fibrous reinforcing layers to impregnate the reinforcing layers with resin throughout their thickness, and
    6. allowing the resin in the sheet and layers to cure under said compression to form a unitary structure.

2. A process as in claim 1 wherein the fibrous reinforcing material is a glass fiber mat.

3. A process as in claim 1 wherein the thermosetting resin is an epoxy resin.

* * * * *